(12) United States Patent
Shmidt et al.

(10) Patent No.: US 10,532,323 B2
(45) Date of Patent: Jan. 14, 2020

(54) HOLLOW-FIBER MEMBRANE DEVICE AND METHOD FOR THE PRODUCTION THEREOF

(71) Applicant: Electrophor Inc., Woodmere, NY (US)

(72) Inventors: Joseph Lvovich Shmidt, Woodmere, NY (US); Nikolaj Victorovich Erukov, St. Petersburg (RU); Stanislav Sergeevich Kuznetsov, St. Petersburg (RU)

(73) Assignee: Electrophor Inc., Woodmere, NY (US)

( * ) Notice: Subject to any disclaimer, the term of this patent is extended or adjusted under 35 U.S.C. 154(b) by 3 days.

(21) Appl. No.: 15/501,702

(22) PCT Filed: May 26, 2015

(86) PCT No.: PCT/RU2015/000325
§ 371 (c)(1),
(2) Date: Feb. 3, 2017

(87) PCT Pub. No.: WO2016/018174
PCT Pub. Date: Feb. 4, 2016

(65) Prior Publication Data
US 2017/0225124 A1    Aug. 10, 2017

(30) Foreign Application Priority Data
Jul. 30, 2014    (RU) ................................ 2014131717

(51) Int. Cl.
*B01D 63/04* (2006.01)
*B01D 69/02* (2006.01)
(Continued)

(52) U.S. Cl.
CPC ............. *B01D 63/04* (2013.01); *B01D 63/02* (2013.01); *B01D 69/08* (2013.01); *B01D 2325/24* (2013.01)

(58) Field of Classification Search
CPC .... B01D 2325/24; B01D 63/04; B01D 69/02; B01D 69/08; B01D 63/02; B01D 63/022;
(Continued)

(56) References Cited

U.S. PATENT DOCUMENTS

| 4,179,380 A | 12/1979 | Amicel et al. |
| 6,290,756 B1 | 9/2001 | Macheras et al. |

(Continued)

FOREIGN PATENT DOCUMENTS

| CN | 103055699 | 4/2013 |
| DE | 3838063 | 5/1990 |

(Continued)

OTHER PUBLICATIONS

International Search Report of PCT/RU2015/000325 dated Sep. 24, 2015; 1 page.
(Continued)

*Primary Examiner* — Pranav N Patel
(74) *Attorney, Agent, or Firm* — Fitch, Even, Tabin & Flannery LLP

(57) ABSTRACT

The group of inventions relates to technologies for purifying liquid, primarily water for the domestic and/or drinking water supply in domestic and/or industrial conditions and in allotments and gardens. The characterizing feature of the group of inventions is that the design of a hollow fibre membrane device envisages, and a method for the manufacture thereof enables, the formation of a protective layer consisting of a single polymeric fixing material on the internal surfaces of mono-fibre sections which are incorporated into a binding unit, and the formation of sections which are in the form of a composite in the binding unit, which increases the strength of the hollow fibre membrane device, wherein open channels in the binding unit, formed with the aid of protective elements of an assembly base, make it
(Continued)

a)

b)

possible to increase the specific filtering surface. The general problem addressed by the group of inventions, and the technical result which can be achieved with the use of the group of inventions, consists in creating a design of a hollow fibre membrane device and in developing a method for producing the design of the device, making it possible to increase the strength characteristics of the hollow fibre membrane device while simultaneously increasing the specific filtering surface.

1 Claim, 6 Drawing Sheets

(51) Int. Cl.
  *B01D 69/08* (2006.01)
  *B01D 63/02* (2006.01)
(58) Field of Classification Search
  CPC .................. B01D 65/003; B01D 65/108; B01D 2313/21; B01D 2313/23; B01D 2313/04; B01D 2313/06; B01D 2313/025
  See application file for complete search history.

(56) References Cited

U.S. PATENT DOCUMENTS

| | | | |
|---|---|---|---|
| 6,592,759 B2 | 7/2003 | Rabie et al. | |
| 6,623,637 B1 | 9/2003 | Monzen et al. | |
| 6,685,832 B2 | 2/2004 | Mahendran et al. | |
| 7,931,463 B2 | 4/2011 | Cox et al. | |
| 8,182,687 B2 | 5/2012 | Beck et al. | |
| 8,506,808 B2 | 8/2013 | Burr et al. | |
| 8,679,337 B2 | 3/2014 | Ishibashi et al. | |
| 2008/0044643 A1 | 2/2008 | Yokota et al. | |
| 2008/0179249 A1* | 7/2008 | Beck .............. | B01D 63/02 210/650 |
| 2010/0276355 A1* | 11/2010 | Kashihara .............. | B01D 63/022 210/321.89 |

FOREIGN PATENT DOCUMENTS

| | | |
|---|---|---|
| JP | S61407 | 1/1986 |
| JP | H0747241 | 2/1995 |
| RU | 2060804 C1 | 5/1996 |
| RU | 2007108535 A1 | 9/2008 |
| WO | 2005063366 | 7/2005 |
| WO | 2006137671 | 12/2006 |

OTHER PUBLICATIONS

Supplemental European Search Report for EP15827415.9 dated Jan. 22, 2018; 5 pages.

* cited by examiner a)

b)

a)

b)

HOLLOW-FIBER MEMBRANE DEVICE AND METHOD FOR THE PRODUCTION THEREOF

The group of inventions relates to technologies for purifying liquid, preferably water for domestic and/or drinking water supply in domestic and/or industrial conditions, in allotments and gardens.

Hollow-fiber membrane devices and methods for the production thereof are sufficiently wide spread. Two factors determine strength characteristics of the hollow-fiber membrane devices: a strength of a bonding block and a strength of monofibers in a hollow-fiber matrix at a bonding block surface. The bonding block strength is understood as a strength of attaching monofilaments in the bonding block at the absence of voids between end parts of the monofilaments in the bonding block. The strength of monofibers in the hollow-fiber matrix at the bonding block surface is understood as a mechanical breaking strength under the action of a liquid flow in the microfibers of the hollow-fiber matrix in a section above the bonding block surface. The parameter important for the hollow-fiber membrane devices is also a specific filtering surface which is a ratio of a surface taking part in the filtration process to total size of a device. The specific filtering surface depends upon a monofiber packing density in the hollow-fiber matrix: at the same sizes of a device, the denser is arrangement of monofibers in the matrix, the larger is the specific filtering surface. The specific filtering surface also depends upon a ratio of a number of monofibers with a channel opened throughout its length in the hollow-fiber matrix to a total number of monofibers of the matrix. Based on the foregoing, therefore, four characteristics important for the hollow-fiber membrane devices are known.

Known from the prior art is a hollow-fiber membrane device according to U.S. Pat. No. 6,290,756 (IPC B01D 53/22, B32B 31/00, published on 18 Sep. 2001) describing a hollow-fiber membrane matrix consisting of a plurality of monofibers and a bonding block formed by attaching a hollow-fiber matrix in a epoxy resin-based polymeric fixing material. At the same time, the polymeric fixing material has a low affinity for a material of monofibers, therefore, there is practically no cooperation caused by capillary forces between the monofiber material and the polymeric fixing material, and the monofibers are attached in the bonding block only by mechanical forces. To provide the strength of the bonding block, therefore, the non-dense arrangement of the monofibers in the hollow-fiber matrix is necessary owing to which the uniform distribution of a polymeric filtering medium around the monofibers is achieved. At the same time, in view of the non-dense arrangement of the monofibers in the hollow-fiber matrix, there is reduction in the specific filtering surface. Further, implementation of the invention according to U.S. Pat. No. 6,290,756 also leads to reduction in the specific filtering surface because the structure of the device and the method for the production thereof do not provide protection of open channels in the monofibers of the hollow-fiber matrix against inflow of the polymeric fixing material over lower edges of walls of the monofibers while said inflow results in closure of an open channel by the polymeric fixing material. Thus, improvement in one of characteristics important for the hollow-fiber membrane device takes place due to deterioration in another one which is the main disadvantage of the present solution.

The disadvantage of said device according to U.S. Pat. No. 6,290,756 was partially eliminated in the prior art hollow-fiber membrane devices and the methods for the production thereof according to U.S. Pat. No. 6,592,759 (IPC B01D 63/00, published on 15 Jul. 2003), U.S. Pat. No. 6,685,832 (IPC B01D 63/00, published on 3 Feb. 2004) and U.S. Pat. No. 7,931,463 (IPC B29D 39/08, B29C 39/10, published on 26 Apr. 2011). In the noted cases, the assembly substrates being metal plates with openings for attachment of the monofibers of the hollow-fiber matrix therein are used for the production of the hollow-fiber membrane device. Said type of the assembly substrates is designed to protect open channels of the monofibers in the hollow-fiber matrix against inflow of the polymeric fixing material over lower edges of walls of the monofibers. To protect open channels of the monofibers, methods for the production of the hollow-fiber membrane devices in said solutions comprise two-step potting, and a first step thereof uses a fluid or gel-like material which coats lower ends of the monofibers to protect the open channels against inflow of the polymeric fixing material through a lower edge of a wall of the monofibers at the second potting step, the second potting step uses a curable polymeric fixing material to form the bonding block, wherein the polymeric fixing material does not penetrate walls of the monofibers of the hollow-fiber matrix. Thus, the absence of the monofibers having channels clogged with the polymeric fixing material is provided. At the same time, the presence of an assembly substrate embodied as metal plates with openings makes it impossible to achieve the most dense arrangement of the monofibers in the hollow-fiber matrix. Thus, the advantage in the specific filtering surface by keeping the channels of the monofibers of the hollow-fiber matrix open is mitigated by the non-dense arrangement of the monofibers in the hollow-fiber matrix. At the same time, the presence of the assembly tooling makes it possible to achieve an arrangement of the monofibers in the hollow-fiber matrix which allows the uniform distribution of the polymeric fixing material so as to provide the strong attachment of the monofibers in the bonding block. With this, the structures of the device and the method for the production thereof do not provide protection of the monofibers of the hollow-fiber matrix at the surface of the bonding block. Thus, the main disadvantage of the known solutions consists in that they do not allow production of the hollow-fiber membrane devices having simultaneously all four important characteristics; further, the methods of said inventions including the two-step potting are complex and require the careful selection of polymeric fixing materials.

Known from the prior art is the solution according to U.S. Pat. No. 6,623,637 (IPC B01D 63/10, B01D 63/02, published on 23 Sep. 2003). A hollow-fiber membrane device according to the patent includes a hollow-fiber matrix woven of a plurality of monofibers and a bonding block formed by fixing the hollow-fiber matrix in a polymeric fixing material, wherein thermoplastic resins having a high affinity for a material of the monofibers and an easy fluidity are used as the polymeric fixing material. The formation of the hollow-fiber matrix by weaving the monofibers makes it possible to accomplish a high density of the monofibers in the hollow-fiber matrix owing to which a specific filtering surface increases wherein the easy fluidity and the high affinity of the polymeric fixing material for the material of the monofibers allow the uniform distribution of the polymeric fixing material around the monofibers so as to provide the strong fixing the monofibers in the bonding block. At the same time, the high affinity of the polymeric fixing material for the material of the monofibers allows penetration of the polymeric fixing material into walls of the monofibers in parallel with the polymeric fixing material curing process. Penetrating of the polymeric fixing material through entire thickness of a wall of at least one of the monofibers results in the instant filling of an open channel in a given monofiber with the polymeric fixing material throughout a width of said channel, which is considered as a structural defect; since only the monofibers with open channels are suitable for filtration of a liquid, then, the situation when the open channel in at least one of the monofibers is filled throughout its width leads to reduction in the specific filtering surface. To decrease a number of monofibers having a channel filled with the polymeric fixing material, a lower portion of the bonding block is cut off after formation of the bonding block, wherein the monofibers having a channel potted with the polymeric fixing material remain in the finished hollow-fiber membrane device, which is the main disadvantage of the present invention.

Known from the prior art is a hollow-fiber membrane device according to U.S. Pat. No. 8,182,687 (IPC B01D 63/00, B01D 61/00, B29C 73/00, published on 22 May 2012), consisting of a hollow-fiber matrix formed of monofibers each having an open inner channel, and of a bonding block. A method for the production of said hollow-fiber device comprises, after completion of forming the bonding block, the step of introducing members into an open channel of each monofiber, said members strengthening portions of the monofibers at the boundary of the bonding block. Said members are, for example, a protection layer formed of a material different from that of the monofibers and of a polymeric fixing material applied onto an inner surface of the monofibers at terminal parts included in the bonding block after formation of the bonding block or, for example, solid protection members such as nozzles being introduced into open channels of the monofibers. At the same time, the protection members have no sufficient affinity to the material of the monofibers, therefore, the resulted structure is not sufficiently strong; further, the disclosed method for the production of the hollow-fiber membrane device is quite complex, which is the main disadvantage of the present device.

Known from the prior art are a hollow-fiber membrane device and a method for the production thereof according to U.S. Pat. No. 8,506,808 (IPC B01D 63/04, B01D 63/06, B01D 69/08, published on 13 Aug. 2013), selected as the closest prior art. The device according to the patent consists of a hollow-fiber matrix formed of a plurality of monofibers each having an open channel, and of a bonding block formed of end segments of the monofibers fixed in a polymeric fixing material of the end segments. At the same time, the polymeric fixing material subjected to capillary forces penetrates walls of the monofibers to form segments formed of a material of the monofibers with inclusions of the polymeric fixing material penetrating into pores of the material of the monofibers, wherein a height of the segments is higher than a height of the bonding block while a width of the present segments is not wider than a wall thickness of each monofiber.

The formation of the present segments provides reinforcement of the monofibers at a surface of the bonding block. Simultaneously, the present invention uses an assembly substrate embodied as a metal plate with openings and protecting open channels of the monofibers against inflow of the polymeric fixing material over lower edges of walls of the monofibers and also providing a low density in arrangement of the monofibers in the hollow-fiber matrix and the uniform distribution of the polymeric fixing material, which allows strong fixing of the monofibers in the bonding block. At the same time, there is reduction in a specific filtering due to not large density in arrangement of the monofibers in the hollow-fiber matrix. Thus, improvement in strength characteristics takes place due to deterioration in the specific filtering surface. At the same time, the structure and the method for the production of said hollow-fiber membrane device involve the careful selection of a material of the monofibers and the polymeric fixing material as well as the careful monitoring of the bonding block forming process in order to produce the distribution of the polymeric fixing material in a material of the monofibers, as disclosed in U.S. Pat. No. 8,506,808, and provide the curing of the polymeric fixing material earlier than the polymeric fixing material subjected to capillary forces penetrates through a wall of at least one monofiber and closes an open channel and reduces the specific filtering surface, which is the disadvantage of the known solution.

A common object for the group of inventions and a technical result accomplished using the group of inventions is to provide a novel structure and a simple method for the production of a hollow-fiber membrane device which allow improvement in strength characteristics of the hollow-fiber membrane device at simultaneous increase of a specific filtering surface.

Said object and the required technical result are accomplished by a hollow-fiber membrane device including a hollow-fiber matrix and at least one bonding block impermeable for a liquid, wherein the hollow-fiber matrix is formed of a plurality of monofibers each having an inner open channel and at least one end segment fixed in the bonding block and consisting of interleaved segments made of the polymeric fixing material, segments formed by end segments of the monofibers with inclusions of the polymeric fixing material penetrating into pores of the material of the monofibers, and open channels extending throughout a height from a lower surface to an upper surface of the bonding block and having a diameter of an inner lumen not higher than an inner diameter of each monofiber included in the hollow-fiber matrix, said channels in a number corresponding to a number of the monofibers in the hollow-fiber matrix and being arranged such that an open portion of each channel of the bonding block transits into an open portion of a channel in each monofiber, according to the invention an inner surface of segments of the monofibers included in the bonding block having a protection layer formed of the polymeric fixing material while each segment of the bonding block formed by end segments of the monofibers with inclusions of the polymeric fixing material penetrating into pores of the material of the monofibers is embodied as a composite due to interaction of the material of the monofibers and the polymeric fixing material, wherein the open channels of the bonding block are formed using solid protection members of an assembly substrate. Said object and the required technical result are accomplished by a method for the production of a hollow-fiber membrane device, comprising sequential forming a plurality of monofibers of a hollow-fiber matrix and forming at least one bonding block wherein at least one end of each monofiber of the hollow-fiber matrix is fixed, and according to the invention forming the hollow-fiber matrix and forming the bonding block are performed by using an assembly substrate including solid protection members in a number not smaller than a number of the monofibers in the hollow-fiber matrix which are introduced, at the step of forming the hollow-fiber matrix, with an upper end into an open channel of each monofiber included in the hollow-fiber matrix for at least a part of a height of a protection member and which are potted with the polymeric fixing material at the step of forming the bonding block without distortion of attachment to the hollow-fiber matrix, wherein the step of forming the hollow-fiber matrix is carried out using the assembly substrate having a fixed number of protection members or the step of forming the hollow-fiber matrix is carried out using individual protection members each having one end of an individual monofiber attached thereon, followed by the step of attaching all protection members to form the assembly substrate and next removing the assembly substrate completely out of the hollow-fiber device after formation of the bonding block or leaving a plurality of solid protection members of the assembly substrate made of a soluble material within open channels of the bonding block and of the monofibers of the hollow-fiber matrix with a possibility of dissolution of said members after filtration of a liquid.

The characterized aspect of the group of inventions is that the structure of the hollow-fiber membrane device involves and the method for the production thereof allows formation of a protection layer of one polymeric fixing material on inner surfaces of monofiber segments included in the bonding block and formation of segments embodied as a composite in the bonding block, which increases the strength of the hollow-fiber membrane device, wherein the bonding block open channels formed using the protection members of the assembly substrate allow increasing of the specific filtering surface.

The disclosed structure of the hollow-fiber device and the method for the production thereof are universal and do not require careful selection of the material for the monofibers and the polymeric fixing material, wherein use of the assembly substrate with protection members allows the one-step formation of both the bonding block including segments of the composite and the protective layer on the inner surface of the monofibers; thus, the disclosed structure and method are technologically simpler than that of the closest prior art, which is the advantage in economic terms and in practice of the inventions as well.

Figure 1:
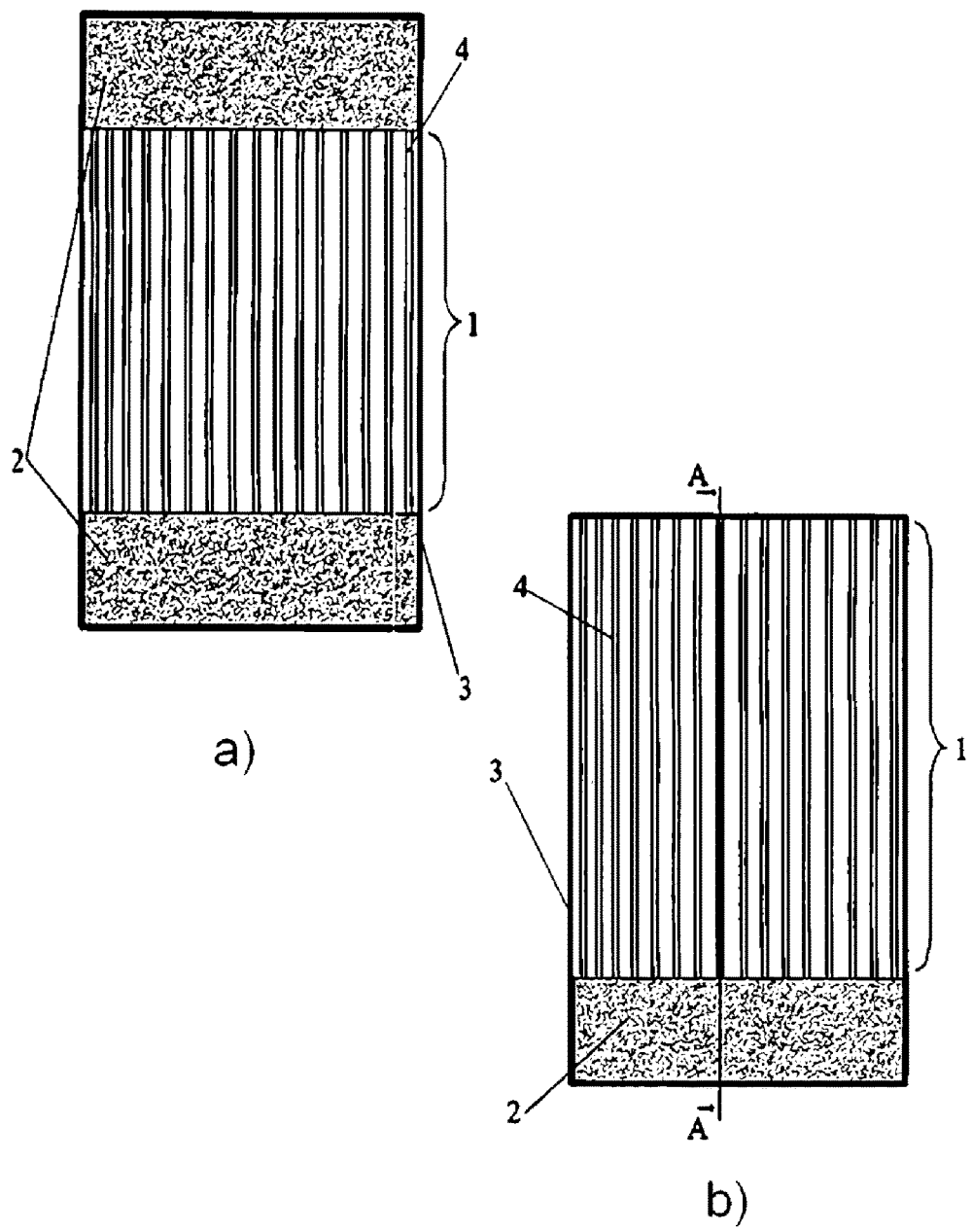
FIG. 1a and FIG. 1b show examples of a hollow-fiber membrane device.

A hollow-fiber membrane device (FIG. 1a) consists of a hollow-fiber matrix (1) formed of a plurality of monofibers (4) and, for example, but not limited only to, two bonding blocks (2) impermeable for a liquid. Or, for example, a hollow-fiber membrane device (FIG. 1b) consists of a hollow-fiber matrix (1) formed of a plurality of monofibers (4) and one bonding block (2) impermeable for a liquid. At the same time, at least one end segment of each monofiber (4) of the hollow-fiber matrix is included in the bonding block (2). At the same time, a size, a shape of the hollow-fiber membrane device and a configuration of the hollow-fiber matrix (1) included in the hollow-fiber membrane device may be set in any way depending upon a purpose of the hollow-fiber membrane device. Further, the hollow-fiber membrane device (FIG. 1) may comprise a housing (3) made of the polymeric material, for example, but not limited to only, polyethylene, polypropylene or polystyrene.

The hollow-fiber matrix (1) in turn consists of the plurality of monofibers (4) (FIG. 1). At the same time, each monofiber (FIG. 2) presents an ultra-, micro- or nanoporous walls (5) of the polymeric material, for example, but not limited to only, polyolefin (polyethylene, polypropylene, etc.), polysulphone, polyvinylchloride, and an open channel (6).

The bonding block (FIGS. 2a, 2b) consists of two types of interleaved segments (7 and 8) and open channels (11).

The first-type segments (7) of the bonding block are formed of the polymeric fixing material, for example, but not limited to only, polypropylene or polyurethane.

The second-type segments (8) of the bonding block formed as end segments of the monofibers with inclusions of the polymeric fixing material penetrating into pores of the material of the monofibers, contrary to the closest prior art, are embodied as a composite wherein the material of the monofibers fulfills the function of the matrix while the polymeric fixing material fulfills the function of a reinforcing filler. The adhesion between the segments (7) made of the polymeric fixing material and the composite segments (8) is more than that between the segments of the bonding block in the closest prior art; therefore, the strength of attachment of the monofibers in the bonding block increases. At the same time, when the segments made of the composite touch each other by outer walls, they can attach to each other; thus, formation of the strong bonding block is possible if the monofibers are arranged closely to each other. Further, contrary to the closest prior art where the end segments (8) of the monofibers included in the bonding block should pass the bonding block through from an upper surface to a lower surface, the end segments (8) of the monofibers included in the bonding block of the claimed hollow-fiber membrane device may be arranged above the lower surface of the bonding block (FIG. 2b).

In the scope of the characterizing features, an inner surface of the end segments of the monofibers is provided with a protection layer (9) formed of a polymeric fixing material. The presence of the protection layer increases the strength of the monofibers at the surface of the bonding block, which in combination with the increased strength of attaching the monofibers in the bonding block provides increase in the strength of the hollow-fiber membrane device.

Furthermore, each monofiber included in the hollow-fiber matrix comprises a segment (10) at the boundary with the surface of the bonding block, said segment also providing the increased strength of the monofibers at the boundary with the surface of the bonding block and being formed due to penetration of the polymeric fixing material subjected to capillary forces into the monofibers of the hollow-fiber matrix. At the same time, contrary to the closest prior art, the distribution of the polymeric fixing material over a width of each monofiber has a shape close to parabolic one, in other words, the distribution of the polymeric fixing material in the invention is more uniform than that in the closest prior art, therefore, the invention has the higher strength.

Figure 2:
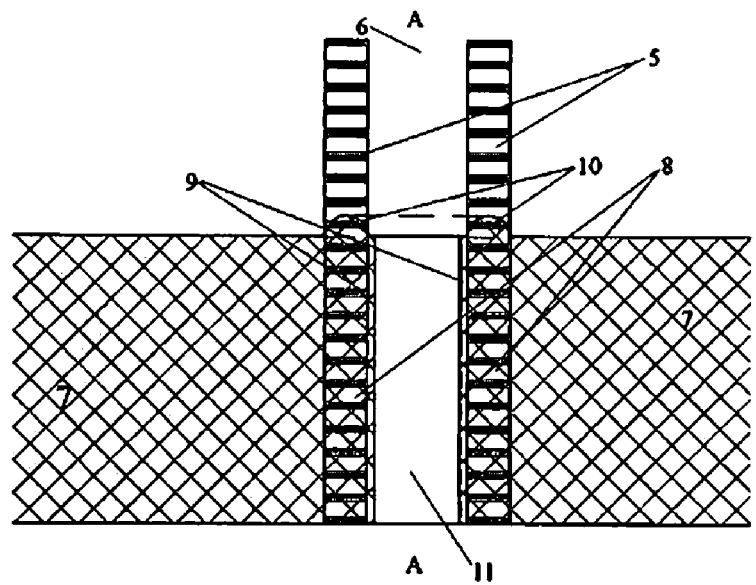
FIG. 2a and FIG. 2b show examples of a longitudinal section A-A (FIG. 1) of monofibers in a hollow-fiber matrix and of a bonding block in the hollow-fiber membrane device.
Figure 2:
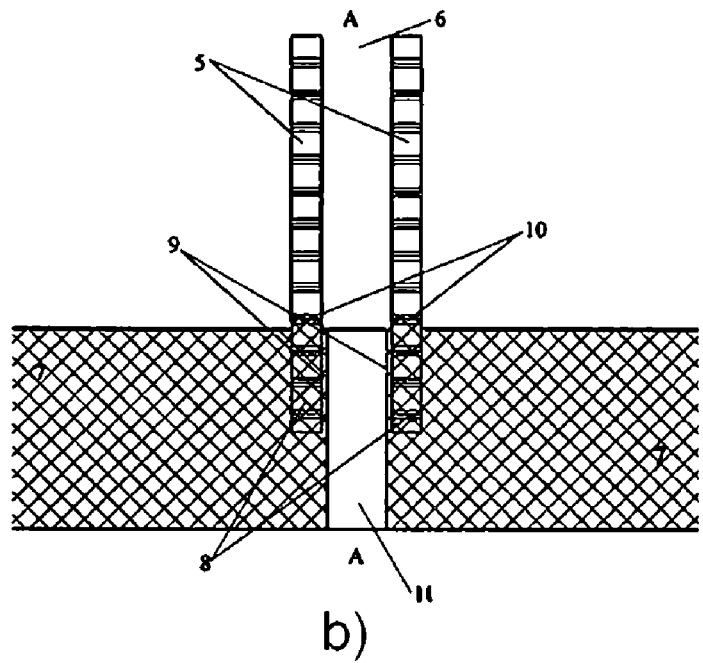

A height of the open channels (11) in the bonding block (FIG. 2) corresponds to a height of the bonding block, while a diameter thereof is not more than an inner diameter of the monofibers. The open channels (11) of the bonding block preferably, but not limited to only, are the segments of the open channels (6) of the monofibers (FIG. 2a). Or, for example, the open channels (11) of the bonding block may consist of the segments of the open channels (6) of the monofibers and of the open channels formed in the segments made of the polymeric fixing material (not shown in Figures). At the same time, the open channels (11) of the bonding block are formed using protection members of an assembly substrate and their number corresponds to a number of the monofibers in the hollow-fiber matrix while in arrangement they correspond to the open channels (6) of the monofibers. Thus, each monofiber of the hollow-fiber matrix in the device has an open inner channel, which in combination with the possibility to have as high arrangement density of the monofibers in the hollow-fiber matrix as up to, but not limited only to, a value at which the monofibers may be arranged closely, provides increase in the specific filtering surface.

Thus, the structure of the hollow-fiber membrane device has simultaneously the increased strength and the large specific filtering surface.

The hollow-fiber membrane device is intended for the purification of a liquid, preferably water, and its operation principle may be, for example, as follows. The hollow-fiber membrane device (FIG. 1) is located in a housing of a liquid purification device (not shown in the Figures) or, in case if the housing (3) of the hollow-fiber membrane device is provided with fastening members (not shown in the Figures), the hollow-fiber membrane device is cut into a liquid supply system such that an input flow of a raw liquid is directed, for example, into a space (not shown in the Figures) between the monofibers (4) of the hollow-fiber matrix (1) of the device. In doing so, the liquid purification process takes place, and all monofibers (4) of the hollow-fiber matrix (1) of the device take part therein. The progress of the liquid purification process exemplified by one monofiber (FIG. 2) is as follows: particles of a pure liquid having a diameter less than that of pores in a wall (5) of an individual monofiber of the hollow-fiber matrix penetrate the pores in the wall (5) of the individual monofiber and run into an open channel (6) of the monofiber, while impurity particles having a diameter larger than that of pores in the wall (5) of the individual monofiber of the hollow-fiber matrix remain in a space (not shown in the Figures) between the monofibers of the hollow-fiber matrix of the device; a purified liquid from the open channel (6) of the monofiber arrives at the open channel (11) of the bonding block from which it is supplied to a pure liquid conditioning system (not shown in the Figures) or a pure liquid accumulator (not shown in the Figures) or a means for supplying the pure liquid to a user (not shown in the Figures). The liquid purification process goes similarly in each monofiber (4) of the hollow-fiber matrix (1) of the device (FIG. 1). Not being limited to only the foregoing, the liquid purification may be, for example, as follows. A raw liquid is supplied by a raw liquid supply system or device (not shown in the Figures) coupled to the bonding block (2) (FIG. 1) of the liquid purification device while a pure liquid flows out of said device through an opening (not shown in the Figures) in the housing (3) of the device. At the same time, the progress of the liquid purification process exemplified by one monofiber (FIG. 2) is as follows. The raw liquid arrives at the open channel (11) of the bonding block from which it flows to the open channel (6) of the monofiber and then the pure liquid particles having the diameter less than that of pores in the wall (5) of the individual monofiber of the hollow-fiber matrix penetrate into the space (not shown in the Figures) between the monofibers of the hollow-fiber matrix (1) while impurity particles having the diameter larger than that of pores in the wall (5) of the individual monofiber of the hollow-fiber matrix remain in the open channel (6) of the individual monofiber.

A method for the production of a hollow-fiber membrane device consists in the process as follows.

Figure 3:
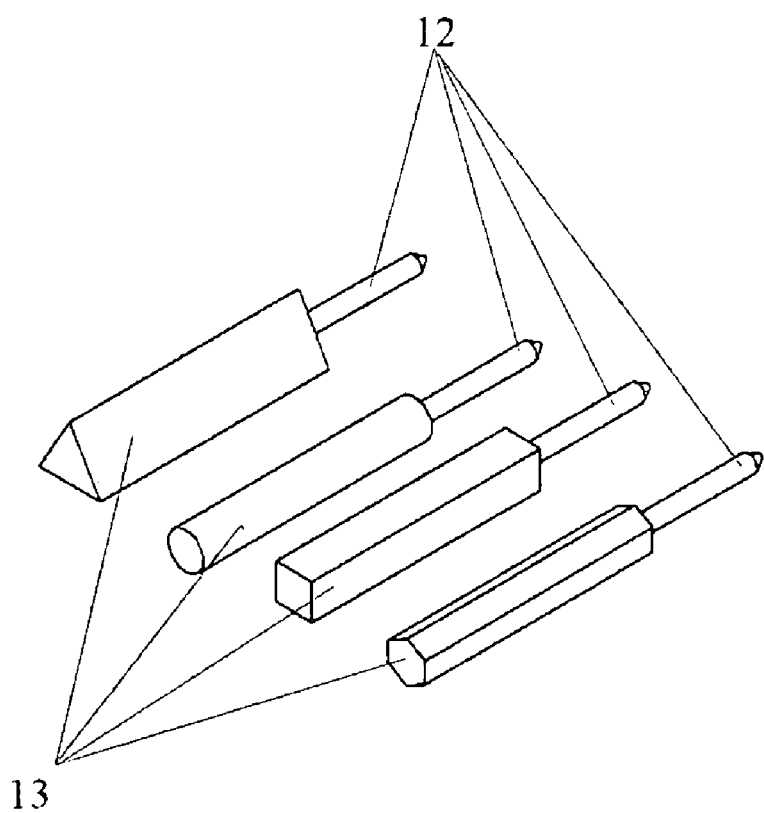
FIG. 3 shows examples of an appearance of an individual protection member.
Figure 4:
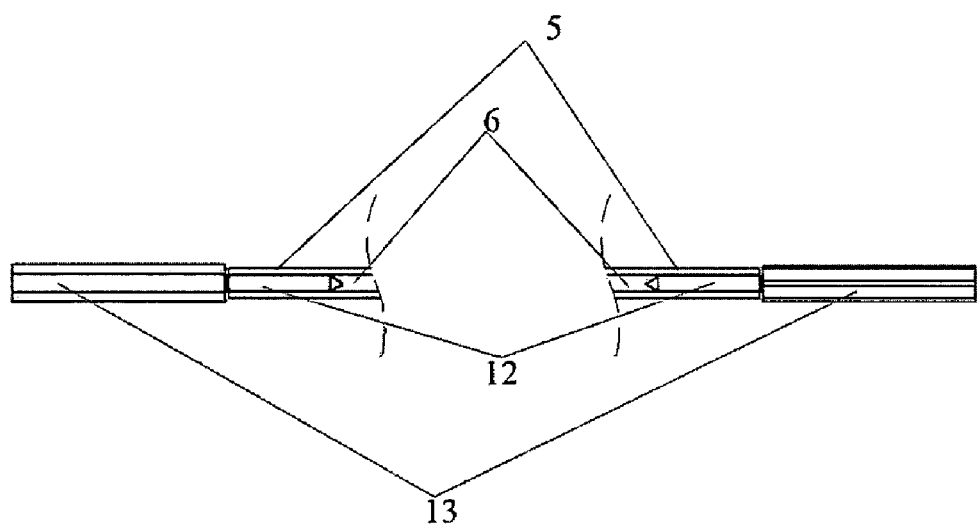
FIG. 4 shows an example of attachment of an individual monofiber on protection members.
Figure 5:
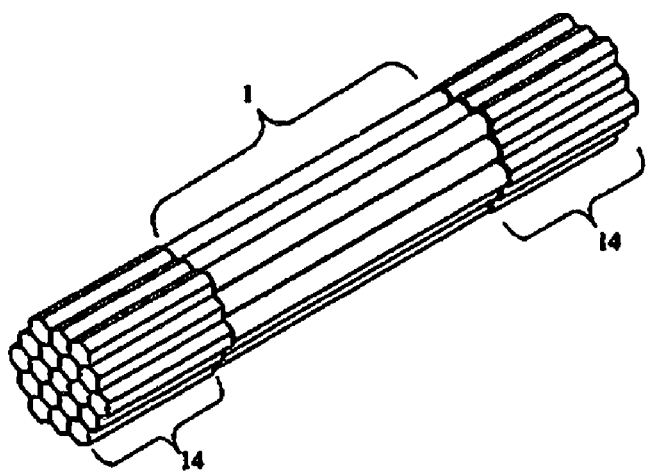
FIG. 5a and FIG. 5b show examples of a formed hollow-fiber matrix.
Figure 5:
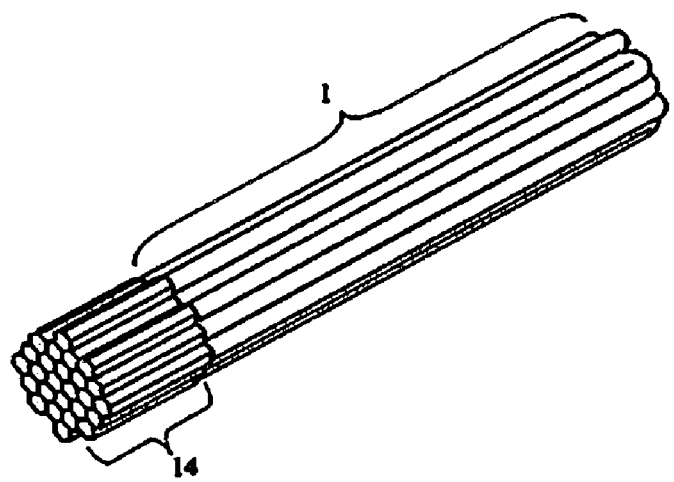

There is the step of forming a hollow-fiber matrix preferably, but not limited to only, by attaching monofibers of a fixed length on individual protection members (FIG. 3) which consist of bonding members (12) attached on frame members (13) which may be embodied for example, but not limited to only, in the form of a prism having a base in the form of a regular hexahedron, a cylinder, a prism with a base in the form of a triangle or parallelepiped. At the same time, there is the step of stringing each monofiber preliminary cut down to the fixed length at one end onto one individual protection member and stringing at another end onto another individual protection member such that at least a larger portion of the fixing member (12) is within the open channel (6) of the monofiber. Or, for example, there is the step of stringing an end of a monofiber skein wound up onto a spool onto an individual protection element followed by unwinding and cutting the monofiber for a given length, and then stringing a second end of the monofiber onto another individual protection member. Said sequence of steps is repeated many times until production of a plurality of monofibers with ends attached on the protection member (FIG. 4). There is the step of forming a hollow-fiber matrix (1) of a plurality of monofibers stringed at the two ends onto the protection members, said formation being carried out, for example, but not limited to only, by laying the monofibers one by one (FIG. 5a). In doing so, there is the step of attaching the individual protection members between each other to form an assembly substrate (14) using a mastic and/or using grooves on a frame portion (13) of an individual member. It is also possible to form the hollow-fiber matrix (1), for example, by assembling the monofibers attached on the individual protection members and preliminary bound in the form of U (FIG. 5b) into a bundle. In addition, it is also possible to form the hollow-fiber matrix (1), for example, using an assembly substrate having a fixed number of protection members (not shown in the Figures), said formation including stringing the monofibers of a fixing length onto the protection members of the assembly substrate such that one protection member corresponds to each end of the monofiber, wherein a shape of the hollow-fiber matrix is determined by a shape of the assembly substrate (not shown in the Figures).

Figure 6:
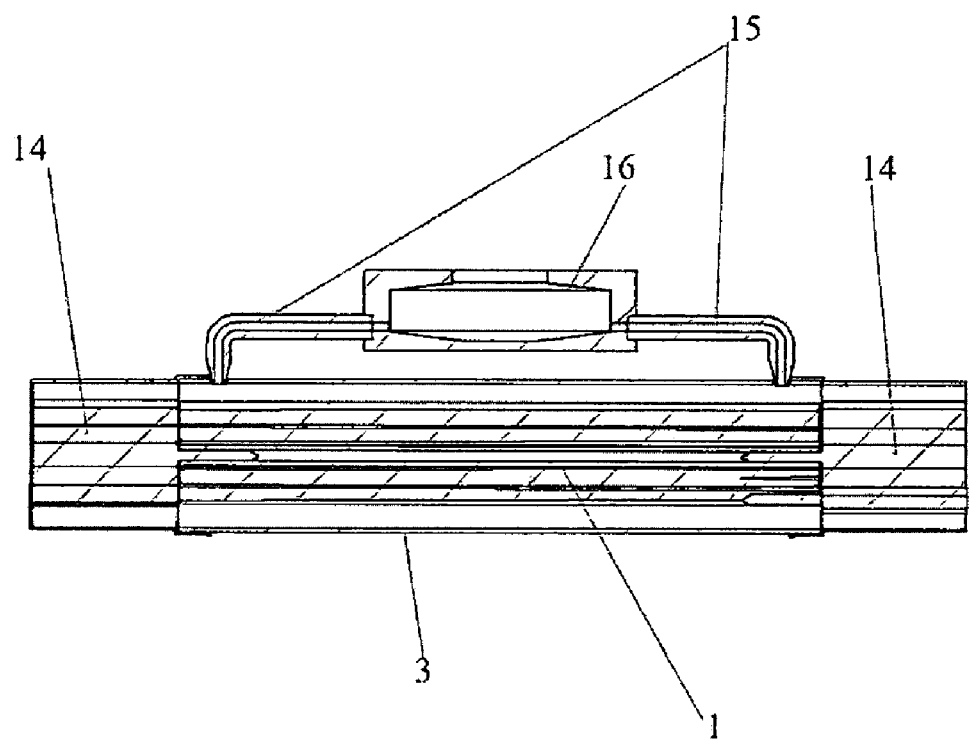
FIG. 6 shows an example of attachment of the formed hollow-fiber matrix in a potting device and connection to a system for supplying a polymeric fixing material.

Next, there are the steps of placing the formed hollow-fiber matrix (1) together with the assembly substrate (14) into the housing (3), attaching said matrix using the fastening members of the potting device (not shown in the Figures) and connecting said matrix to a system for supplying the polymeric fixing material, said system including a polymeric fixing material reservoir (16) and polymeric fixing material supply channels (15) (FIG. 6). At the same time, said housing (3) may be formed, for example, of a polymeric material and may be a component of a hollow-fiber membrane device. Or the housing may be formed, for example, of stainless steel and be a part of a fastening system for the potting deice (not shown in the Figures).

The formation of the assembly substrate (14) is also possible already after placement of the hollow-fiber matrix (1) into the housing (3). The housing (3) with the hollow-fiber matrix (1) are fastened by fastening members of the potting device (not shown in the Figures) and connected to the system for supplying the polymeric fixing material which forms the assembly substrate (14) after curing.

A thickness of the formed assembly substrate (14) is higher than a height of the frame members (13) by approximately one third of their dimension. For example, but not limited to only, an epoxy resin or polyurethane may be used as the polymeric material which forms the assembly substrate (14) after curing.

Next, there is the step of supplying the polymeric fixing material, for example, but not limited only to the listed embodiments, polyurethane or polyolefin, for example, polypropylene or polyethylene. In doing so, there is the step of forming the bonding block (2) to form simultaneously a composite segment (8) and a protection layer (10) which provide the higher strength of the devise while keeping the open channels of the monofibers (6) which provide the large specific filtering surface. It is preferable, but not limited to only, that the polymeric fixing material is supplied in rotation of the hollow-fiber membrane device attached in the potting device, for example, by a centrifuge (not shown in the Figures). Furthermore, in case if polyolefins, for example, polypropylene or polyethylene, are used as the polymeric fixing material, the step of casting the housing (3) of the hollow-fiber membrane device is possible simultaneously with the step of forming the bonding block (2); in this case, the housing being the part of the fastening system of the potting device (not shown in the Figure) fulfils also the function of a mold for the housing of the hollow-fiber membrane device. After completion of supplying the polymeric fixing material in a given amount, the supply of the polymeric fixing material is stopped and simultaneously—if the polymeric fixing material was supplied at rotation—the rotation of the hollow-fiber device is stopped. After curing of the polymeric fixing material, the finished hollow-fiber device is removed from the potting device and separated from the assembly substrate (14). In doing so, the assembly substrate (14) is completely removed or a plurality of solid protection members of the assembly substrate formed of the soluble material, for example, solid crystals of water-soluble salts, are left within the open channels of the bonding block and of the monofibers of the hollow-fiber matrix so as to be dissolved then in filtration of the liquid.

When the hollow-fiber device is formed by potting the hollow-fiber matrix with two layers of polymeric materials, the two polymeric materials do not glue between each other when they contact each other, because the two polymeric materials are selected such that they have no adhesion with respect to each other. Or the steps of curing the polymeric material which forms the assembly substrate and of forming the assembly substrate (14) are followed by the step of applying, for example, but not limited only to, a silicone or petrolatum layer onto a surface of the assembly substrate thereby to create an interlayer of a material having adhesion neither to the polymeric material of the assembly substrate nor to the polymeric fixing material which forms the bonding block. In the latter case, it does not matter whether or not the polymeric materials have adhesion with respect to each other, so a range of used materials becomes wider. After curing of the polymeric fixing material which forms the bonding block, it is possible to separate the assembly substrate (14) from the hollow-fiber device without clogging and damaging the end segments of the plurality of the monofibers forming the hollow-fiber device.

The description of the present invention submits a preferred embodiment of the invention. It can be changed within the claimed set of claims, so the wide use of the invention is possible.

The invention claimed is:

1. A hollow-fiber membrane device comprising a hollow-fiber matrix and at least one bonding block impermeable for a liquid, wherein the hollow-fiber matrix comprises:

a plurality of monofibers having an inner open channel and at least one end segment attached in one of the at least one bonding block and consisting of interleaved segments made of a polymeric fixing material, composite segments formed by the at least one end segments of the plurality of the monofibers with inclusions of the polymeric fixing material penetrating into pores of the material of the plurality of the monofibers, and open block channels extending throughout a height from a lower surface to an upper surface of the one of the at least one bonding block and having a diameter not larger than an inner diameter of each of the plurality of monofibers included in the hollow-fiber matrix, said open block channels arranged such that an open portion of individual ones of the open block channels of the one of the at least one bonding block transits into an open portion of the inner open channel of corresponding ones of the plurality of the monofibers, wherein an inner surface of individual ones of the at least one end segments of the monofibers included in the one of the at least one bonding block has a protection layer formed of the polymeric fixing material that interacted with the material of the monofibers to form the composite segments.

* * * * *